(12) United States Patent
Yusim et al.

(10) Patent No.: US 9,077,150 B2
(45) Date of Patent: Jul. 7, 2015

(54) HIGH POWER ULTRA-COMPACT, LIGHTWEIGHT MULTI-KILOWATT FIBER LASER SYSTEM BASED ON COHERENT AND SPECTRAL BEAM COMBINING

(71) Applicants: Alex Yusim, Boston, MA (US); Roman Yagodkin, Worcester, MA (US)

(72) Inventors: Alex Yusim, Boston, MA (US); Roman Yagodkin, Worcester, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 13/961,617

(22) Filed: Aug. 7, 2013

(65) Prior Publication Data

US 2015/0043597 A1 Feb. 12, 2015

(51) Int. Cl.
| | |
|---|---|
| *H01S 3/067* | (2006.01) |
| *H01S 3/23* | (2006.01) |
| *G02B 6/00* | (2006.01) |
| *H01S 3/00* | (2006.01) |
| *H01S 3/0941* | (2006.01) |

(52) U.S. Cl.
CPC ........... *H01S 3/2383* (2013.01); *H01S 3/06754* (2013.01); *H01S 3/06758* (2013.01); *G02B 6/00* (2013.01); *H01S 3/06704* (2013.01); *H01S 3/06708* (2013.01); *H01S 3/09415* (2013.01); *H01S 3/2391* (2013.01); *H01S 3/0064* (2013.01)

(58) Field of Classification Search
CPC .............. H01S 3/0064; H01S 3/06708; H01S 3/06754; H01S 3/06758; H01S 3/2383; H01S 3/2391
USPC ............................................................ 372/6
See application file for complete search history.

(56) References Cited

U.S. PATENT DOCUMENTS

| | | | | |
|---|---|---|---|---|
| 7,440,174 | B2 * | 10/2008 | Rice et al. .................. | 359/341.1 |
| 7,884,997 | B2 * | 2/2011 | Goodno ........................ | 359/349 |
| 8,294,982 | B2 * | 10/2012 | Her ............................. | 359/341.1 |
| 2009/0273828 | A1 * | 11/2009 | Waarts et al. .............. | 359/341.1 |
| 2012/0188626 | A1 * | 7/2012 | Rothenberg et al. .......... | 359/239 |

* cited by examiner

*Primary Examiner* — Yuanda Zhang
*Assistant Examiner* — Michael Carter
(74) *Attorney, Agent, or Firm* — Yuri Kateshov, Esq.; Timothy J. King, Esq.

(57) ABSTRACT

A high power fiber laser system consisting of multiple fiber amplifier or laser systems amplifying the input signal in parallel is configured with a high power splitter such as to share some of the gain stages. The high power splitting component consists of high power fiber couplers and splitter(s). The splitter is a holographic optical element, a dielectric coated plate, a diffraction grating, or a volume Bragg grating. The resultant fiber laser configuration reduces the total number of amplifying stages including optical isolators and active fiber assemblies for the system and thus reduces the total volume and weight.

15 Claims, 5 Drawing Sheets

HIGH POWER ULTRA-COMPACT, LIGHTWEIGHT MULTI-KILOWATT FIBER LASER SYSTEM BASED ON COHERENT AND SPECTRAL BEAM COMBINING

CROSS REFERENCE TO RELATED APPLICATION

This is a continuation in part of U.S. provisional application 61/680,526 filed on Aug. 7, 2012 with the US PTO.

FIELD OF THE DISCLOSURE

The present invention relates to an ultra compact fiber laser system configuration with a high power to weight ratio configured with a plurality of spectrally and coherently combined fiber laser systems.

BACKGROUND OF THE DISCLOSURE

Fiber lasers have achieved immense output powers with superior beam quality. As the power from a single fiber laser with good beam quality is scaled further to 10 s of kW, it has become more difficult to circumvent nonlinear optical effects and core damage.

A couple methods have been demonstrated to scale the power beyond a single fiber laser power limit. In these approaches, multiple fiber lasers are combined in order to achieve 100s of kW of optical power with good beam quality. One approach is to spectrally combine multiple fiber lasers. In another approach, the fiber lasers are coherently combined.

In the case for coherent combining, a single low power seed is split into multiple beams and seeds all of the amplifiers. The amplifiers amplify the same signal and the output from each amplifier is combined coherently at the output using a number of know methods. As a number of amplifiers increases, so does the overall package weight.

In the case of spectral combining, multiple low power seed lasers, each with different wavelength, are input to their respective amplifiers. The outputs from the amplifiers are spectrally combined using a number of known methods. Needless to say, the overall weight of these systems is also excessive.

The real world solution will require many fiber lasers that are packaged in a compact ultra light weight package. High power fiber lasers have innumerous industrial and military applications. Speaking of the latter, various military carriers, such as tanks, airplanes and the like, are frequently equipped with high power fiber lasers. As well known, the space in these carriers is greatly limited. Typically, fiber laser systems each include a number of stages each consisting of the preamplifier and high power amplifiers. The stages are separated by isolators. The total weight of the combined fiber laser systems is often prohibitively high. As a result, known high power fiber laser systems have an output power to total weight of optical components ratio reaching 0.5 kW per kg.

A need therefore exists for lightweight high power fiber laser systems, utilizing coherent and spectral beam combining, that have power to weight ratios higher than that of the known prior art.

SUMMARY OF THE DISCLOSURE

This need is met by the disclosed high power fiber laser system utilizing either coherent or spectral combining methods. The latter includes a launching fiber laser system with a plurality of gain stages, a free space beam splitter and multiple receiving fiber laser systems. Multiple gain stages incorporated in the launching laser system allows emitting a high power input signal. In the disclosed system, the input signal propagates over free space and is incident on the free space splitter which is operative to divide the input signal into a plurality of sub-input signals. The sub-input signals are further coupled into respective receiving high power amplifier systems over free space. The amplified sub-signals are eventually combined in a kW-MW system beam radiated substantially in a fundamental mode or, if required, multiple modes.

The receiving systems are connected in parallel. Accordingly, adding the same number of gain stages as those removed from one receiving stage, to the launching fiber laser system allows disposing of the same number of gain stages from each of the receiving systems. Overall, the total number of gain stages is decreased, when compared to a reference fiber laser system, by $$L \times (k-1) - 1,$$

wherein L is a plurality of gain stages in launching system, and k is a plurality of receiving fiber laser systems. The reduced number of gain stages allows decreasing the overall mass and volume of the high power fiber laser system so that a ratio between a total kW-MW output power and a total number of gain stages varies between about 1 and ⅓ kW per kg.

The receiving fiber systems each include an all glass multiclad passive fiber or connecter receiving the sub-input signal and guiding it downstream from the very upstream end which is particularly vulnerable due to a mounting process. The cladding modes are removed preferably along a splice region between the connecter and an input fiber which guides the received sub-input signal to the gain stage or stages.

The disclosed high power free space beam splitter may have either a single or multiple bulk splitting components. The splitting components include a number of embodiments disclosed below.

In accordance with one aspect, the disclosed structure has multiple free space fiber receiving components that are resistant to optical damage as disclosed in U.S. Pat. No. 7,580,600 fully incorporated herein by reference and owned commonly with the present disclosure.

In accordance with another aspect, the beam exiting the input fiber is high power with optical power reaching up to about 10 kW. Such high power beams can induce optical damage to components downstream even after split to powers as low as 100 mW.

The beam size is chosen to reduce intensity at the optical components downstream in order to prevent optical damage.

In accordance with another aspect, the disclosed splitter is a holographic optical element (HOE). The light coupled out and collimated from a single mode fiber and split into a number of orders from the HOE. Each beam corresponding to each order is coupled into different output fibers using single or multiple lenses.

In accordance with a further aspect, the disclosed splitter is a dielectric coated optical component that splits the beam into 2 after the beam exits and is collimated from the input fiber. Then another dielectric coated optical component splits the beam in two again creating 4 beams. This can then be repeated to generate the number of desired output laser beams. Each of the final split lasers beams are coupled back into the fiber using a focusing component.

In accordance with another aspect, the disclosed has a bulk grating or a volume Bragg grating that splits the polychromatic single collimated beam exiting the input fiber into multiple narrow linewidth beams with different center wavelength and couples each beam into the free space high power fiber coupler.

In accordance with another aspect, the splitter is contained inside the same package as an output isolator/circulator that separates the preamplifier and high power stages. The beam is split after the isolator/circulator subcomponents and then launched into each of the high power fiber couplers.

In accordance with still another aspect, the beam exiting the input fiber is collimated and then split before entering multiple isolators/circulators and further split after exiting the isolators/circulators into multiple beams and then coupled into each high power fiber coupler.

BRIEF DESCRIPTION OF THE DRAWINGS

The above and other features, aspects and advantages will become more readily apparent from the specific description disclosed in conjunction with the following drawings, in which.

SPECIFIC DESCRIPTION

Reference will now be made in detail to the disclosed system. The drawings are in simplified form and are far from precise scale. The word "couple" and similar terms do not necessarily denote direct and immediate connections, but also include connections through intermediate elements or free space. The term "reference high power fiber laser system" means a system operative to output a system beam, which has the same power as the disclosed fiber laser system, and structured with a launching fiber laser system, a plurality of parallel receiving amplifier fiber systems k each with an N gain stages, and a beam splitter between the launching and receiving fiber laser systems.

Figure 2:
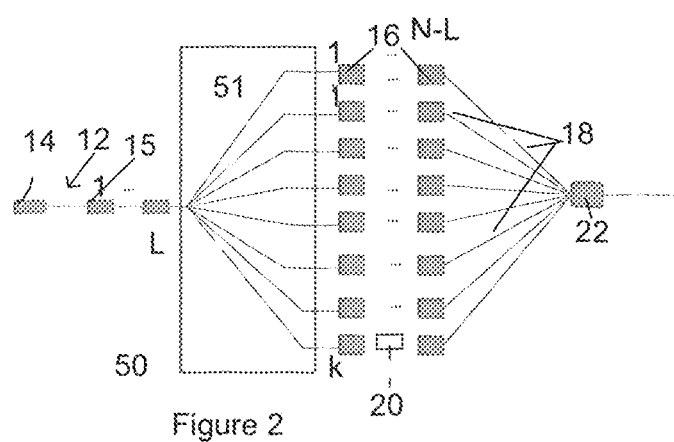
FIG. 2 a general representation of the proposed laser configuration demonstrating the benefit of this type of configuration.

Referring to FIG. 2, the disclosed high power fiber laser system ("HPS") 50 is configured with a launching fiber laser system 12 which includes a fiber seed source 14 and one or more gain stages 15 coupled in series to one another to emit an input signal which may be as high-powered as about 10 kW. The emitted input signal is split into a plurality of sub-input signals coupled into respective power amplifier systems 18 over free space. The HPS 50 further includes a housing 51 encasing a free space high power beam splitter which receives the input signal over free space and divides the received signal into the sub-input signals each having a power lower than that of the input signal. The sub-input signals are coupled into respective power amplifier receiving fiber laser systems 18 over free space.

The configuration with launching fiber laser system 12 having multiple fiber gain stages 15, which were removed from one of receiving systems 18, considerably lowers the overall weight of the disclosed package or system 50 by reducing the total number of gain stages of receiving amplifier systems 18, because the latter are connected in parallel. Specifically, compared to the reference system of FIG. 1, each receiving system 18 has N–L stages, wherein L is a number of stages 15 removed from receiving system 18 and incorporated in launching system 12. Accordingly, a total number of gain stages in system 50 is reduced by L×(k−1)−1, wherein k is the number of receiving amplifier systems 18 disclosed in more detail below.

In the reference system, sub-signals coupled into respective receiving fiber laser systems 18 each are gradually amplified while propagating along a series of gain stages 1, 2, 3 . . . N to eventually reach the desired power at the output of each receiving laser system 18. Assuming that L gain stages (L<N) are removed from each of receiving systems 18, to compensate for the lost power, the same L stages are coupled into the launching fiber laser system 12. Since receiving fiber laser system 18 are optically connected in parallel, the same input signal is coupled into each receiving system 18. Accordingly, removing the L gain stages from one of systems 18 and incorporating these gain stages in launching system 12 allows removing the L number of gain stages from each of systems 18 without reducing the desired output power of system 50.

Specifically, receiving amplifier systems 18 each include multiple fiber laser gain stages 16, each amplifying a coupled sub-input signal, and isolators 20 between adjacent stages 16. Coupled parallel to one another, receiving systems 18 output respective high power individual signals which are then spectrally or coherently combined to one another in a system output beam by a combiner 22.

Figure 3:
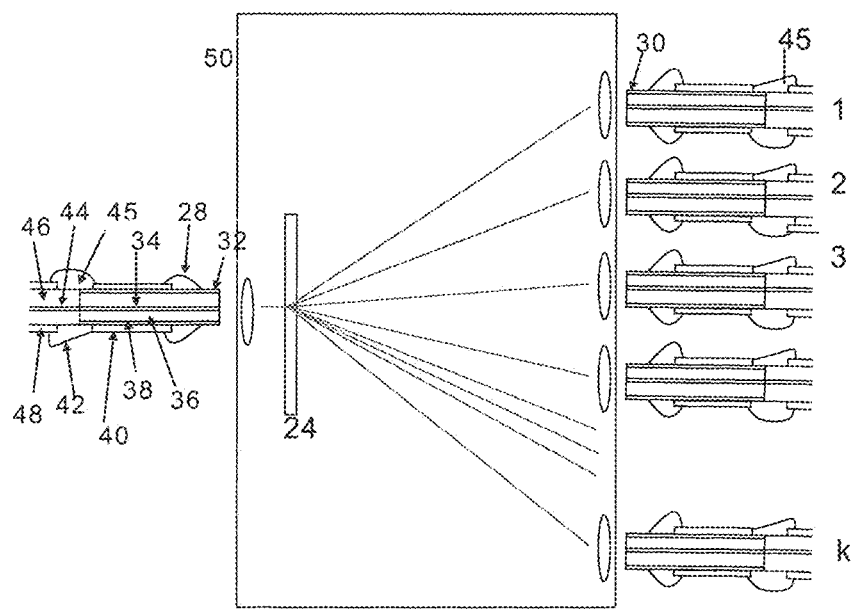
FIG. 3 is a schematic of the high power splitter with free space high power fiber couplers. The splitter shown is a holographic optical element.

Referring to FIG. 3, a free space high power splitter includes a holographic optical element (HOE) 24. The HOE 24 is configured to split the light into a number of orders or sub-signals. Each beam corresponding to each order is coupled into different receiving fibers of respective receiving amplifying systems 18 using single or multiple lenses.

The launching and receiving laser systems include respective downstream and upstream components. The upstream component of each receiving system 18 includes an input fiber 42, a coupler 30 and volume of material 45 extending over adjacent stretches of respective delivery fiber and coupler which are stripped from claddings along a splice. The delivery fiber 42 may have a single mode or multimode core 44 guiding the sub-input signals, cladding 46 and polymeric coating 48. The coupler 30 may have a multiclad fiber configuration with concentrically positioned core 34, inner glass cladding 36 and outer glass cladding 38 which has a refractive index lower than that one of inner cladding 36 which thus guides light coupled into clad 36 downstream from the coupling point. The core 34 of coupler 30 is aligned with and configured to match dimensions of core 44 of delivery fiber 42 so as to minimize splicing losses. The downstream component 32 of launching system 12 may be configured similarly to the upstream component of receiving systems 18 or differently.

A mode stripper 45 extends axially between protective coatings 40 and 48 of respective coupler 30 and delivery fiber 42 and, thus, bridges the splice region between these fibers which is free from the protective coatings. A refractive index of mode stripper 45 is selected to be at least substantially the same as or, preferably, somewhat greater than the index of radially adjacent claddings of the coupler and input fiber. In particular, the material of mode stripper 45 is configured so that the refractive index thereof decreases with increasing temperature and guides power out of glass somewhat at a desired or range of wavelengths.

Figure 3B:
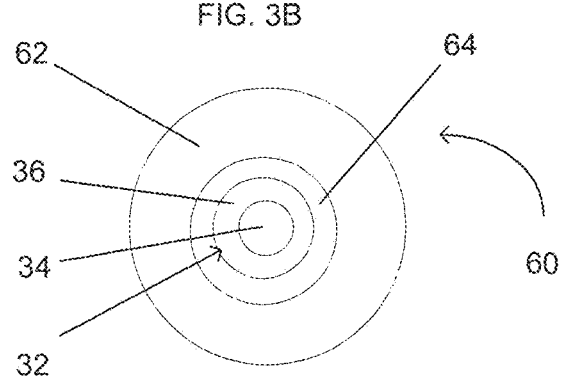
FIGS. 3B-3C is a schematic representation of cladding light remover.
Figure 3C:
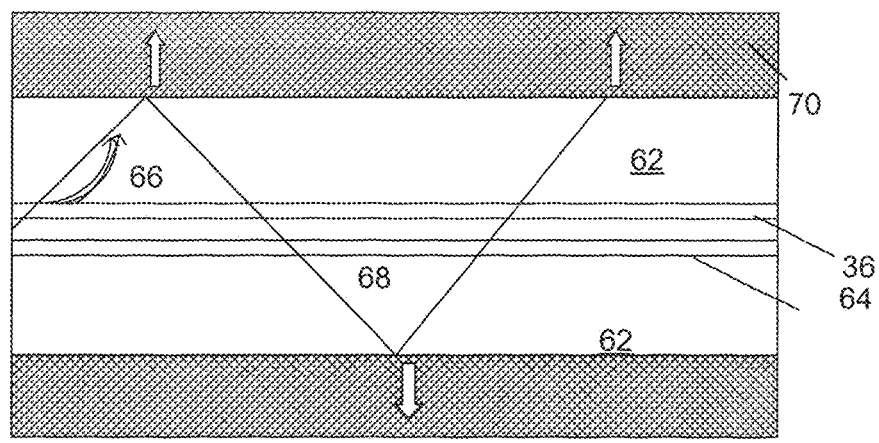

FIGS. 3B and 3C illustrates an embodiment of a cladding light removing mechanism 60 used in combination with the above disclosed cladding light strippers or as an individual mechanism. As known, cladding light originates along a relatively short stretch of fiber. As explained above, most vulnerable to cladding light fiber stretches include splice regions and input and output fiber regions. However, the light removing mechanism may be located along any stretch of a waveguide including coupler 30 and delivery fiber 42. Thus, a waveguide, such as coupler 30 of FIG. 3, has core 34, cladding 36 and a glass capillary 62 which has an outer diameter considerably exceeding the outer diameter of coupler 32. The inner diameter of capillary 62 is configured to be slightly greater than the outer diameter of cladding 36 and, thus, along with cladding 36 defines an annulus 64. The capillary 62 is provided with a refractive index greater than that of cladding 36. The annulus 64 is filled with material having a refractive index greater than that of cladding 36. The material may be a fluid, such as helium, or a solid substance with high plasticity. Accordingly, cladding modes decouple into annulus 64. To remove the decoupled light further, capillary 62 is configured with a refractive index higher than that of material filling up annulus 64. The annulus can be tens of microns wide so as to minimize light absorption therein and hence prevent prohibitively elevated temperatures.

The material filling annulus 64 is selected to provide distributive decoupling of light from cladding 36. Otherwise, high intensity of decoupled light may destroy the material. For example, this material may be silicone. In view of the fact that silicone has a higher coefficient of thermal expansion than that of glass, a rate at which the coefficient of refraction of silicone becomes lower as the temperature increases is considerably higher than that of glass.

In light of the above, when a decoupling process just begins, a refractive index of material in annulus 64 is higher than that of cladding 36 of coupler 30 (the core is not shown for the clarity purposes). As the cladding modes decouple into and are partially absorbed by the material of annulus 64 at an upstream location 66, the material heats up with its coefficient of refraction falling lower than that of cladding 36. The light, decoupled into material 64, further propagates into capillary 62 and to a heatsink 70. Since the index of refraction of cladding 36 becomes higher than that of the material, the cladding waveguides light along a stretch of cladding 36. Hence the following portion of clad light propagates along the waveguiding stretch of cladding 36 until it reaches a point 68 at which the material of annulus 64 remains unheated and, thus, has its refractive index greater than that of cladding 36. At this point another portion of the cladding light is decoupled. This process continues on until practically the entire high power light is removed from cladding 36.

The capillary 62 may include various cross-sections all different from a circular one of FIG. 3B. Importantly, the area of capillary 62 should substantially exceed the area of cladding 36 and its length should be greater than the length of cladding 36. Such a structure allows reducing light intensity, and further avoiding the re-absorption of decoupled light in cladding 36, if capillary 62 starts waveguiding.

Figure 4:
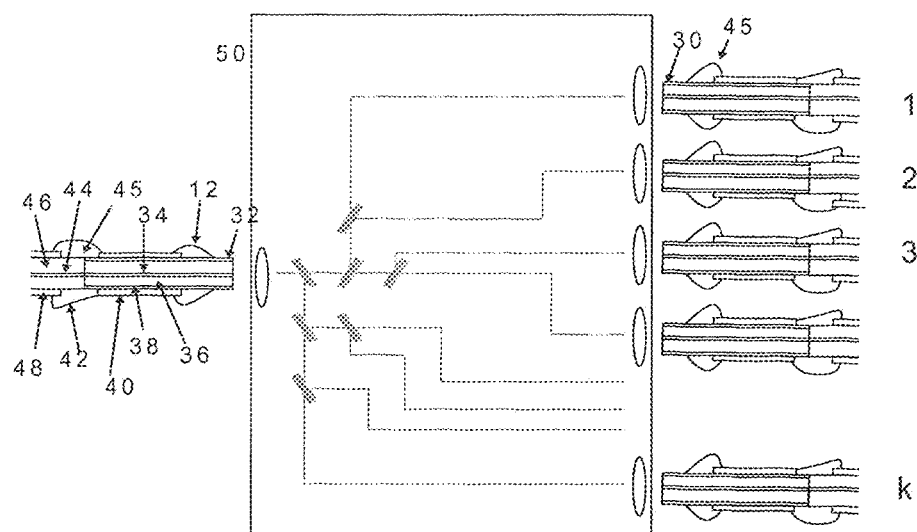
FIG. 4 is a schematic of the high power splitter with free space high power fiber couplers. The splitters shown are dielectric coated elements such glass plates or beamsplitter cubes.

FIG. 4 is a schematic of HPS 50 including dielectric coated elements such glass plates or beam-splitter cubes 70. Each free space splitter 70 divides a beam incident thereupon into two in such a way that each 1 through k high power amplifying stages receives an input.

Figure 5:
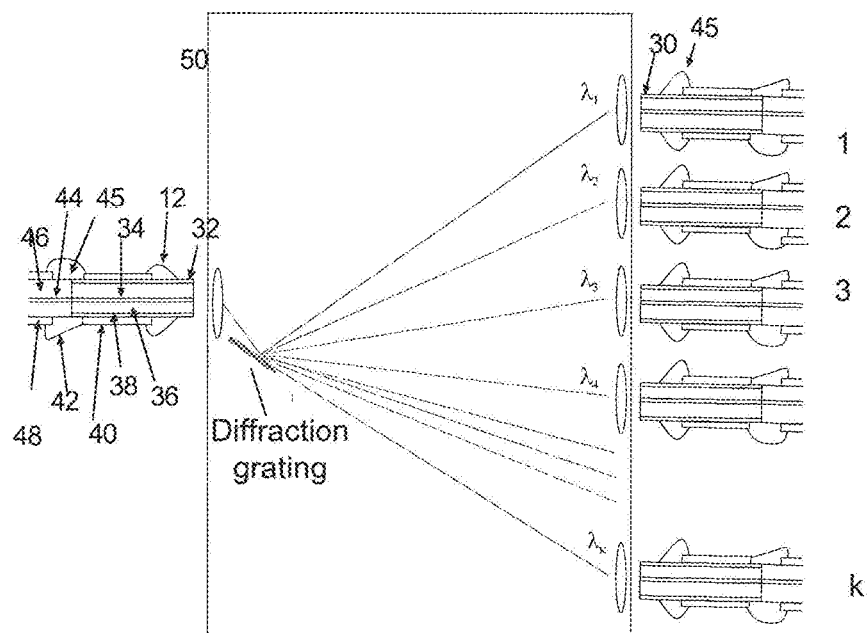
FIG. 5 is a schematic of the high power splitter with free space high power fiber couplers. The splitter shown is diffraction grating.

FIG. 5 illustrates a further embodiment of HPS 50. The latter includes a diffraction grating 72. The grating 72 has a periodic structure, which splits and diffracts light into several beams travelling in different directions. The directions of these beams depend on the spacing of the grating and the wavelength of the light.

Figure 6:
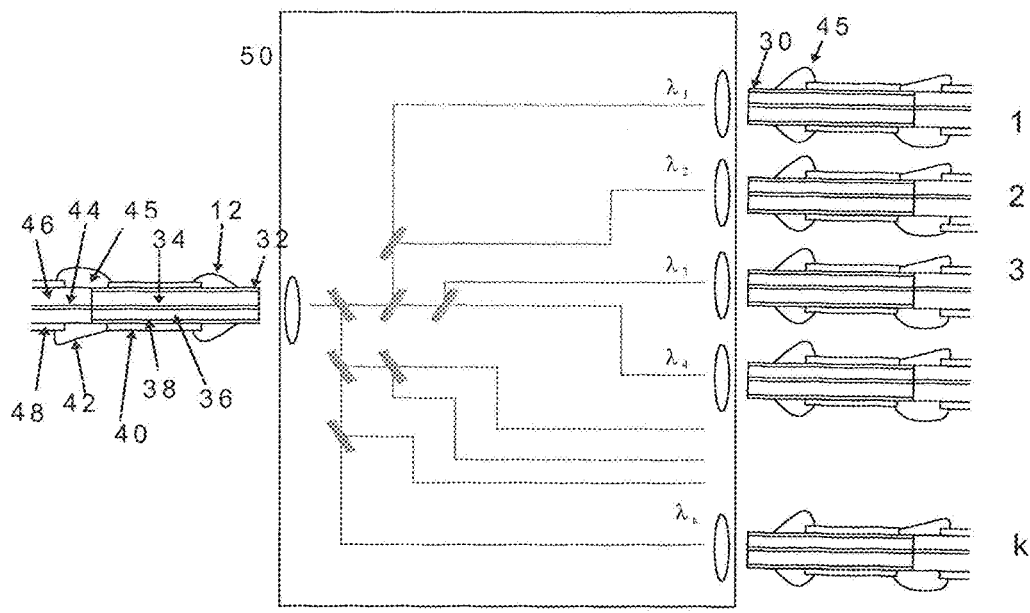
FIG. 6 is a schematic of the high power splitter with free space high power fiber couplers. The splitters shown are volume Bragg grating.

FIG. 6 is a schematic of still another embodiment of HPS 50. In this case the splitter is configured as a volume Bragg gratings ("VBGs") 74. The latter has a periodic structure made in a bulk piece, such glass or polymer. The VBGs 74 are arranged to deliver input beams to respective receiving components 30.

Figure 7:
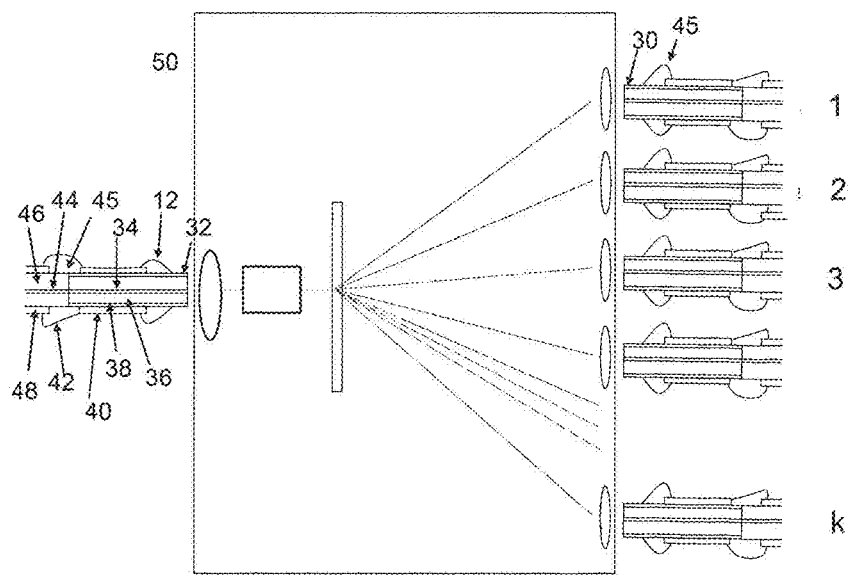
FIG. 7 is a schematic of the high power splitter with free space high power fiber couplers packaged with an isolator or a circulator. The beam is split after exiting the isolator or circulator.

FIG. 7 illustrates HPS 50 configured as a free space isolator or circulator 76 located between a collimator 78 and HOE 24 and spaced therefrom. The isolator/circulator 76 prevents high power backreflection originated along amplifying stages 18 from penetrating to and damaging preamplifier fiber laser system 12. The use of the circulator is preferred because it has a multiplicity of output ports which allows dumping the backreflected light in a desired direction and location.

Figure 8:
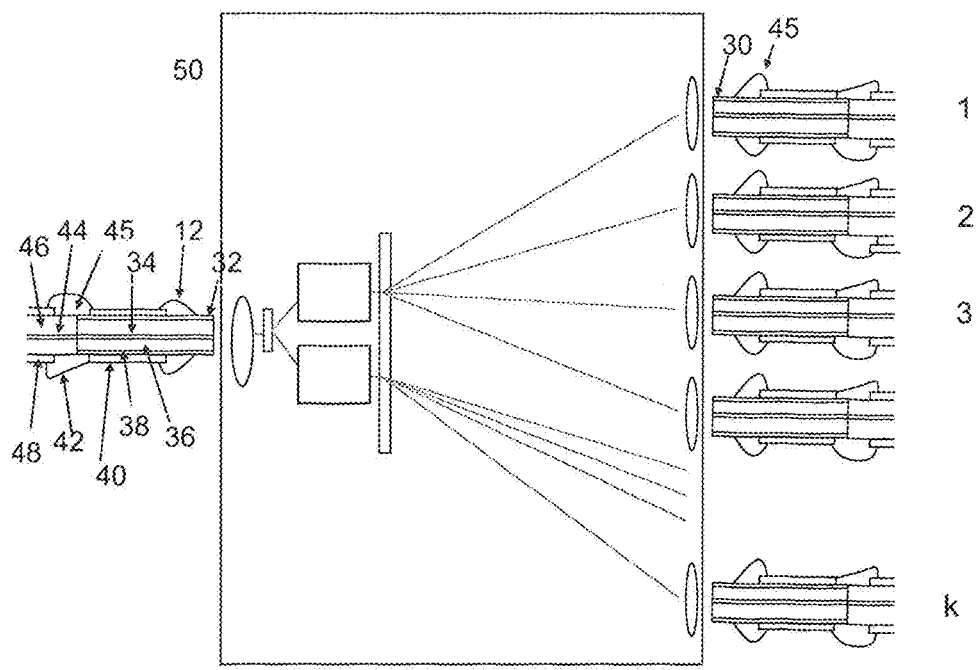
FIG. 8 is a schematic of the high power splitter with free space high power fiber couplers packaged with multiple isolators or circulators. The beam is split before incident on the isolators. The beam is again split after exiting the isolator or circulator.

FIG. 8 shows still another modification of HPS 50. Sometimes input signals are so powerful that bulk optics simply can be destroyed. To prevent such a possibility, a splitter 80 including any of the above disclosed elements in FIGS. 3-6 is mounted immediately downstream from the collimator and upstream from a plurality of bulk components 76 including isolators and/or circulators 76. The HOP 24 is thus impinged upon by two input beams each having a reduced intensity compared to the signal which is output by launching fiber laser system 12. Like in the embodiment disclosed in FIG. 7, backreflection radiation is prevented from propagating towards gain stages of launching system 12.

The following tables illustrate the advantages of the disclosed configuration. In particular, the same 150 kW fiber laser system is illustrated in three different configurations: one representing a prior art system and two other configurations representing the disclosed structure with different number of receiving fiber lase systems.

Figure 1:
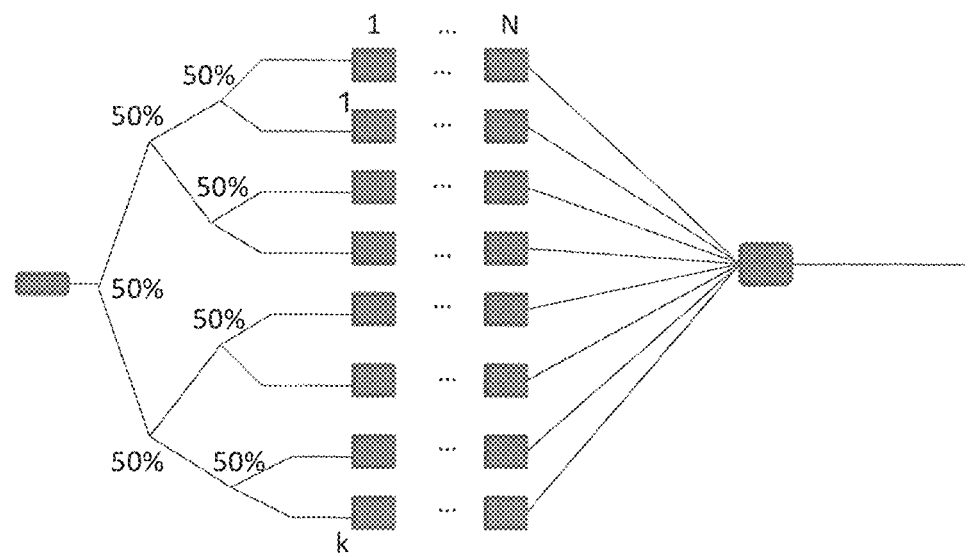
FIG. 1 is a schematic of prior art.

The prior art disclosed 150 kW all fiber laser systems, as illustrated in Table I and configured in accordance with FIG. 1, has a single launching system with a seed source and 100 receiving stages connected through respective fibers to the seed source. The receiving stages each has four gain stages, each including an active fiber, pump diodes. Adjacent stages are separated by a high power bulk isolator mp. Other optical components may include a tap coupler with three a photodiode. Also, a control PC board, mode stripper, and compact isolators are all considered as part of the total number of optical components. A total weight of optical components to total power ratio is 2.062 kg/kW or, inversely, about 0.5 kW/kg ratio.

| 150 kW Fiber Amplifier System<br>1.5 kW Fiber Amplifier Total Component Weight (25 W output from each Preamplifier, no high power splitter) | |
|---|---|
| Qty 32 PLD 60 pump Diodes | 1.28 |
| Qty 4 High power stage - Active fiber Assembly | 0.25 |
| Photodiodes (High Power stage) - Qty 3 | 0.01 |
| Light Strippers - Qty 1 | 0.1 |
| Qty 1 preamp stage - Active Fiber Assembly (seed) | 0.36 |
| Compact Isolators Qty 2 | 0.002 |
| High Power Isolators Qty 2 | 0.84 |
| Tap couplers - Qty 1 | 0.001 |
| Photodiodes (Preamps) - Qty 3 | 0.01 |
| Control PCB | 0.14 |
| Preamp Pump Diodes Qty 1 PLD 60 | 0.04 |
| Preamp Pump Diodes Qty 3 PLD 10 | 0.06 |
| Total Component Weight for 1.5 kW Amplifier | 3.093 |
| Total Components Weight for 150 kW Amplifier System | 309.3 kg |
| kg/kW | 2.062 kg/kW |

Table II illustrates the disclosed configuration in accordance with FIG. 2 representing the invention. In contrast to the prior art system, this 150 kW fiber laser system is configured with a launching system having four gain stages, a one-to-ten beam splitter and ten receiving systems each provided with a single booster. The stages are structured analogously to the stages of the prior art system; in addition, the same optical components considered previously are also accounted for in the disclosed system. As can be seen from table II, each 1.5 kW fiber system including the launching and single receiving systems with a splitter therebetween weighs about 20 kg and 174 g. Accordingly the weight of the entire 15 kW system is 201 kg and 74 grams. Thus, in the illustrated system, each kilowatt corresponds to 1 kg and 345 gram of optical components weight or, inversely, about 0.75 kW per kg.

| 15 kW Fiber Amplifier System Total Component Weight (250 W from each Preamp, split by 10) | |
|---|---|
| Qty 320 PLD 60 pump Diodes | 12.8 |
| Qty 10 High power stage - Active fiber Assembly | 2.5 |
| Photodiodes (High Power stage) - Qty 30 | 0.1 |
| Light Strippers - Qty 10 | 1 |
| Qty 4 preamp stages - Active Fiber Assembly | 0.48 |
| Compact Isolators Qty 3 | 0.003 |
| High Power Isolators Qty 2 | 0.84 |
| Tap couplers - Qty 1 | 0.001 |
| Photodiodes (Preamps) - Qty 3 | 0.01 |
| Control PCB | 0.14 |
| Preamp Pump Diodes Qty 6 PLD 60 | 0.24 |
| Preamp Pump Diodes Qty 3 PLD 10 | 0.06 |
| Splitter | 2 |
| Total Component Weight for 15 kW Amplifier Subassembly | 20.174 |
| Total Components Weight for 150 kW System | 201.74 kg |
| kg/kW | 1.345 kg/kW |

Table II illustrates the 150 kW system including two 75 kW fiber laser systems sharing a preamplifier or launching fiber laser system configured in accordance with the disclosure. Configured with the same optical components, each 75 kW system includes 50 fifty receiving systems each with a single booster. Thus, overall, the 150 kW system has 100 receiving systems. Both 75 kW systems share a single launching system with four gain stages and, additionally, each 75 kW system has its 1 to 50 beam splitter. The total weight of 150 kW system is 175.7 kg with a total weight to power ratio of 1.17 kg/kW or inversely total power to total weight ratio of about 0.82.

Accordingly the weight of the entire 15 kW system is 201 kg and 74 grams. Thus, in the illustrated system each kilowatt corresponds to 1 kg and 345 gram of optical components weight or, inversely, about 0.065 kW per kg.

| 75 kW Fiber Amplifier System Total Component Weight (1.5 kW from each preamp, split by 50) | |
|---|---|
| Qty 1600 PLD 60 pump Diodes | 64 |
| Qty 50 High power stage - Active fiber Assembly | 12.5 |
| Photodiodes (High Power stage) - Qty 50 | 0.5 |
| Light Strippers - Qty 50 | 5 |
| Qty 4 preamp stages - Active Fiber Assembly | 0.48 |
| Compact Isolators Qty 3 | 0.003 |
| High Power Isolators Qty 2 | 0.84 |
| Tap couplers - Qty 1 | 0.001 |
| Photodiodes (Preamps) - Qty 3 | 0.01 |
| Control PCB | 0.14 |
| Preamp Pump Diodes Qty 33 PLD 60 | 1.32 |
| Preamp Pump Diodes Qty 3 PLD 10 | 0.06 |
| High Power Isolator/Splitter | 3 |
| Total Component Weight for 75 kW Amplifier Subassembly | 87.854 |
| Total Components Weight for 150 kW Amplifier System | 175.7 kg |
| kg/kW | 1.17 kg/kW |

Having described at least some of the preferred embodiments of the present invention with reference to the accompanying drawings, it will be apparent to those skilled in the art that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

The invention claimed is:

1. A high power fiber laser system comprising:
a launching fiber laser system having a group of gain stages L optically connected to one another in series so that the launching fiber laser system outputs an input signal;
a plurality of K receiving amplifying fiber laser systems coupled in parallel to one another and spaced from the launching system, the receiving laser systems each having
a plurality of N gain stages optically connected to one another in series,
an input fiber located upstream from the N gain stages and receiving the input signal,
a fiber coupler spliced to a downstream end of the input fiber, and
a clad mode stripper overlaying claddings of respective input fiber and fiber coupler; and
a free space high power beam splitter receiving the input signal over free space and operative to split the first input signal into a plurality of sub-input signals which propagate over free space, the receiving K fiber laser systems receiving respective sub-input signals over free space and being configured to amplify the coupled sub-signals which are combined downstream from the receiving systems in a system beam having an output power Po in a kW range wherein
the launching and receiving fiber laser systems and the beam splitter are configured so that a ratio between a total mass of the launching and receiving fiber laser systems Mtc to the Po is higher than 0.5.

2. The high power fiber laser system of claim 1, wherein the launching and receiving fiber laser systems and the beam splitter are configured so that the kW per kg ratio R varies in a range $0.5 < R \leq 1$.

3. The high power fiber laser system of claim 1, wherein each of the L and N gain stages each have the fiber laser amplifier and a bulk isolator preventing propagation of back-reflected light.

4. The high power fiber laser system of claim 1, wherein the high power beam splitter includes a holographic optical element 5. The high power fiber laser system of claim 1, wherein the high power beam splitter includes one or multiple dielectric coated optics each confiugred as a glass plate or beam cube.

6. The high power fiber laser system of claim 1, wherein the high power beam splitter includes one or multiple diffraction gratings.

7. The high power fiber laser system of claim 1, wherein the high power beam splitter includes one or multiple volume Bragg gratings.

8. The high power fiber laser system of claim 1, wherein the high power beam splitter is packaged together with a single bulk router including at least one of an isolator or circulator.

9. The high power fiber laser system of claim 8, wherein the high power beam splitter is located downstream from the router.

10. The high power fiber laser system of claim 8 further comprising an additional free space beam splitting component located upstream from the router.

11. The high power fiber laser system of claim 1, wherein the mode clad stripper is configured with a capillary surrounding and spaced radially outwards from the claddings adjoining the splice so as to define an annulus therebetween, the annulus being filled with material bridging the capillary and claddings.

12. The high power fiber laser system of claim 11, wherein the material is configured with a refractive index different from that of the claddings and lower than that of the capillary.

13. The high power fiber laser system of claim 12, wherein the refractive index of the material is higher than that of the claddings at a first temperature and lower at a second temperature which is higher than the first temperature, the clad modes being waveguided along the claddings and being outcoupled into the material at spaced locations along the mode clad stripper.

14. The high power fiber laser system of claim 1, wherein the system beam is radiated in substantially a fundamental mode or multiple modes.

15. the high power fiber laser system of claim 1, wherein the ratio is at most 1.

* * * * *